United States Patent [19]

O'Boyle et al.

[11] 4,292,380
[45] Sep. 29, 1981

[54] TWO-CELL BATTERY STRUCTURE

[75] Inventors: Matthew O'Boyle, Timonium; Ross E. Magladry, Towson, both of Md.

[73] Assignee: Catalyst Research Corporation, Baltimore, Md.

[21] Appl. No.: 199,696

[22] Filed: Oct. 23, 1980

[51] Int. Cl.³ .............................................. H01M 6/18
[52] U.S. Cl. .................................. 429/101; 429/153; 429/199; 429/218
[58] Field of Search ............... 429/101, 191, 199, 213, 429/218, 153, 181, 112

[56] References Cited

U.S. PATENT DOCUMENTS

| | | | |
|---|---|---|---|
| 3,674,562 | 7/1972 | Schneider | 429/199 X |
| 3,723,183 | 3/1973 | Greatbatch | 429/199 X |
| 3,817,791 | 6/1974 | Greatbatch et al. | 429/101 |
| 3,994,747 | 11/1976 | Greatbatch et al. | 429/199 |
| 4,117,212 | 9/1978 | Mead et al. | 429/153 |
| 4,147,842 | 4/1979 | Holmes et al. | 429/101 |

Primary Examiner—Anthony Skapars
Attorney, Agent, or Firm—Reed, Smith, Shaw & McClay

[57] ABSTRACT

The invention relates to a two-celled battery for use in cardiac pacer devices which comprises an outer encasement member and first and second internal cell elements. Each of the first and second cell elements includes an insulating cup, a lithium anode positioned within the cup, and a cathode positioned in contact with said anode. Each of the insulating cups includes an opening therethrough such that the lithium anode in the first cell makes contact with a terminal mounted through and insulated from the encasing means and the anode of the second cell is electrically in contact with the cathode of the first cell. The insulating cup of the second cell is positioned within the insulating cup of the first cell and both first and second cells are positioned within the encasing means such that the terminal contact with the first lithium anode and the encasing means is in contact with the cathode of the second cell.

5 Claims, 2 Drawing Figures

TWO-CELL BATTERY STRUCTURE

FIELD OF THE INVENTION

The present invention relates to a lithium halide battery used as a power source in cardiac pacers, and, in particular, to a battery structure for producing a 5.6 volt open circuit potential.

BACKGROUND OF THE INVENTION

Batteries for use in cardiac pacer devices, watches and the like which take advantage of electrochemical systems in which the depolarizer is a charge transfer complex and the anodes are various metals such as lithium have become well known. Illustrative with such batteries are U.S. Pat. Nos. 3,653,966; 3,660,163; 3,674,562; 3,723,183; 3,817,791; 3,874,929; 3,937,635; 3,957,533; 4,049,890; 4,072,803; 4,148,975 and U.S. Pat. No. (Ser. No. 896,639, filed Apr. 17, 1978). The lithium halide batteries disclosed in U.S. Pat. Nos. 3,660,163 and 3,674,562 utilize charge transfer complexes mixed with amounts in excess of stoichiometric of iodine. Improvements in lithium halide primary cells are disclosed in U.S. Pat. No. 4,148,975 in which the depolarizer comprises a particulate mixture of iodine, an organic polymer of either poly-2-vinylpyridine or poly-2-vinylquinoline and a charged transfer consisting of the selected organic and iodine. Batteries utilizing these depolarizers have significant advantages over other prior art cells, particularly in terms of shelf life and current capacity. The depolarizers disclosed therein are useful in the present invention.

The aforementioned batteries have normal open circuit voltages of approximately 2.8 volts. Cardiac pacer devices utilizing this type of battery normally employ a voltage doubling circuit to boost the potential to usable levels. These circuits usually include two separate batteries externally connected in series. While the voltage doubling circuit provides satisfactory results in terms of voltage, they are inherently less reliable than a single battery providing the desired voltage.

It is, therefore, an object of the present invention to provide a single battery having the desired open circuit potential without the disadvantages inherent in a circuit having two batteries in series. It is also an object of the present invention to provide a battery with the desired potential which achieves energy efficiency, in terms of volume and mass, over present two battery systems. It is a further object of the present invention to obviate the need for voltage doubling circuits in cardiac pacer devices and to reduce the price of the power source.

SUMMARY OF THE INVENTION

Generally, the present invention comprises a metal encasing means, preferably made of nickel, which has a top member sealed thereto. The top member includes a terminal pin sealingly positioned therethrough and electrically insulated therefrom by means of a metalized ceramic bead. Positioned within said encasing means are first and second cell elements. Each cell element includes an insulating cup preferably made from a fluorocarbon such as Halar.® Each insulating cup includes an opening therethrough, a lithium anode positioned within said cup and a cathode positioned in contact with the lithium anode. Preferably, the cathode comprises the depolarizer described more fully in U.S. Pat. No. 4,148,975 or Ser. No. 073,188, which is incorporated herein by reference.

The insulating cup of the second cell is positioned within the insulating cup of the first cell so that the lithium anode of said second cell makes electrical contact with the cathode of the first cell. Both cells are positioned within the encasing member so that the lithium anode of the first cell makes electrical contact through the opening in the insulating cup thereof with the terminal mounted on the top member of the encasing means, and such that the cathode of the second cell is in contact with the encasing means itself.

It is preferable to include an expanded metal anode collector between the respective insulating cups and lithium anodes. The current collectors act to collect the current from the surface of the respective anodes and in the case of the first cell the anodes collector is electrically connected to the terminal. Also, it is desirable to include a cathode current collector for the cathode of the first cell element. In the preferred embodiment, a cathode current collector is electrically connected to the anode current collector of the second cell through the opening in the insulating cup of the second cell element.

The battery of the present invention provides a battery having a 5.6 volt open circuit potential with a single encasing means. The battery affords simplified processing and manufacturing techniques designed to provide high reliability for use in cardiac pacer devices. Since only one outercasing is required, the number of metalized ceramic seals needed is reduced to one. Other advantages of the present invention will become apparent from the perusal of the following detailed description of a presently preferred embodiment of the invention taken together with the accompanying drawings.

DETAILED DESCRIPTION OF THE INVENTION

Figure 1:
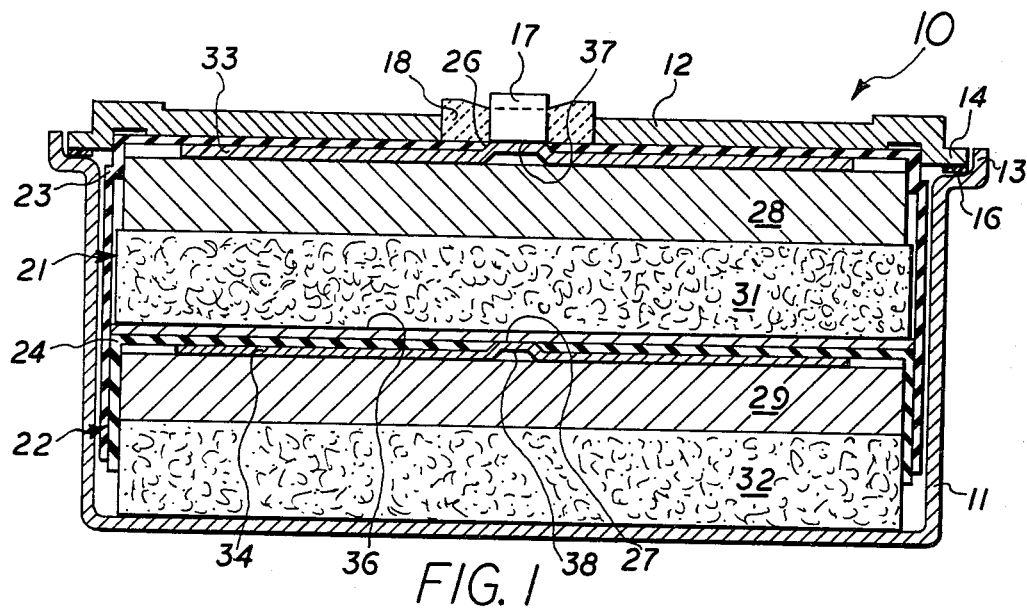
FIG. 1 is a sectional elevation of the presently preferred embodiment of the battery of the present invention.

With reference to the drawing, battery 10 of the present invention comprises an encasing means 11, preferably cylindrical in shape, having a top member 12. Encasing member 11 and top member 12 are preferably made of nickel for extending the useful life of in cardiac pacer devices. Encasing means 11 includes a circumferential lip 13 adapted to receive depending flange 14 of top member 12 and gasket 16 which is interposed between flange 13 and depending flange 14. Gasket 16 is preferably plastic, such as Kapton,® which is maintained under pressure when top 12 is welded to flange 13, preferably by laser weld.

Top member 12 includes a terminal 17 which is positioned therethrough and electrically insulated therefrom by means of a metalized ceramic bead 18. Terminal 17 consists of a nickel post which is OFHC brazed into metalized ceramic bead 18.

Positioned within encasing member 11 are first and second cell elements 21 and 22, respectfully. Each cell element includes an insulating cup 23 and 24, respectfully having openings 26 and 27 therethrough. Positioned within a respective insulating cups 21 and 22 are lithium anode 28 and 29. Positioned in contact with the respective lithium anodes are cathodes 31 and 32. In the preferred embodiment the insulating cup 24 of second cell element 22 is positioned within insulating cup 23 of first cell element 21 so that lithium anode 29 is in electrically contact with cathode 31 of the first cell element.

Preferably, anode collectors 33 and 34 are positioned between the respective insulating cup and lithium anode of the first and second cell elements 21 and 22, respectfully. Anode collector 33 and 34 preferably comprise expanded nickel 200 disc such that the lithium anodes can be extruded into the expanded nickel disc. A cathode current collector 36 is positioned between cathode 31 of the first cell element 21 and insulating cup 24 of second element 22. Cathode current collector 36 preferably comprises a nickel disc which is welded to anode current collector 34 through opening 27 and insulating cup 24 of second cell 22. Anode collector 33 is welded to terminal 17 for electrical contact therewith. It is preferable, that both anode collectors 33 and 34 include a detent 37 and 38, respectively to facilitate welding to associated post 17 and cathode current collector 36.

In the manufacture of the present invention it is preferable to assemble first cell 21 and second cell element 22 independently. Normally, it is desirable to braze terminal 17 into the metalized bead 18 which is simultaneously brazed to nickel cup member 12. Cup member 12 is placed in an inverted position and first cup 23 is positioned so that opening 26 aligns with terminal 17. Expanded anode current collector 33 is then positioned within cup 23 and resistance welded to terminal 17 to sandwich cup 23 between said current collector and top member 12. Lithium anode 28 is then positioned within cup 23 and resistance welded to terminal 17. A pelletized depolarizer 31 is thereafter positioned within cup 23 and in contact with lithium anode 28.

Second cell element 22 is similarly fabricated by positioning cathode current collector 36 on the outside of second cup 24 and anode current collector 34 on the inside of said cup. The assembly is resistance welded together at detent 38 through opening 27 in cup 24. The welding of the anode and cathode current collector sandwiches second cup 24 therebetween. Lithium anode disc 29 is then positioned within cup 24 and resistance welded to cathode current collector 36. The assembly is then sized so as to extrude the lithium anode into the expanded nickel anode current collector 34. Cathode 32 is then positioned adjacent to and in contact with lithium anode 29.

After completing second cell 22, it is positioned within cup 23 of first cell 21 assuring that cathode current collector 36 is in contact with cathode 31 of first cell 21. Gasket 16 is then slipped over the assembly and positioned on flange 14 of top 12. Encasing member 11 is then positioned over the assembly and clamped under pressure with top member 12 so as to compress gasket 16. During compression lip 13 and flange 14 are laser welded together.

Figure 2:
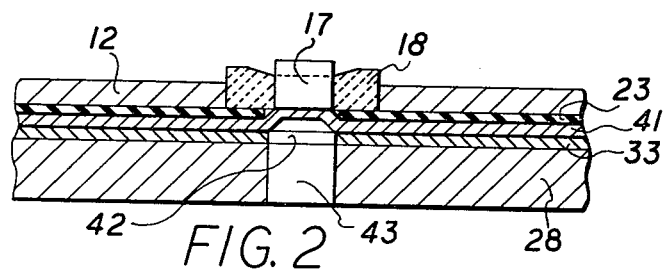
FIG. 2 is an enlarged partial sectional elevation of a second embodiment of the first cell for use in the present invention.

It has been found that during mass spectrometry of the batteries of the present invention using helium bombing and a hard vacuum, flexing of top 12 occurs which can result in a partial or total separation of the weld between the anode and terminal. Accordingly, for batteries that undergo such testing, it is desirable to interpose between the expanded anode current collector 33 and associated cup 23, a solid nickel disc (41, FIG. 2) which is resistance welded to the perimeter of the expanded anodes at a number of locations. Preferably both the expanded nickel current collector 33 and the associated lithium anode 28 include central openings 42 and 43, respectively. Anode 28 is resistance welded to additional disc 41 and current collector 33 and the nickel disc 41 is resistance welded to terminal 17 through the central openings. A lithium plug (not shown) is then inserted within the central openings 42 and 43 and extruded therein. Any flextural stresses applied to the battery during testing are absorbed by the clam shell relationship between the solid nickel discs and the expanded anode collectors which occur during testing.

While presently preferred embodiments of the invention have been shown and described in particularity, the invention may be otherwise embodied within the scope of the appended claims.

What is claimed:

1. A lithium halide battery comprising:
   a. a metal encasing means having a top member sealed thereto, and through which is positioned a terminal and electrically insulated therefrom; and
   b. first and second cell elements positioned within said encasing means, each of said elements comprising an insulating cup having an opening therethrough, a lithium anode positioned within said cup and a cathode positioned in contact with said anode, the opening in said cup of said first cell element being aligned with said terminal and said cup of said second cell element being positioned within said first cup such that said anode of said second cell is in electrical contact with the cathode of said first cell, said first and second cell elements being positioned within said encasing means such that the anode of said first cell is in electrical contact with said terminal through the opening in the cup of said first cell, and the cathode of said second cell is in electrical contact with said encasing means.

2. A lithium halide battery as set forth in claim 1 wherein each of said first and second cells include an expanded metal current collector positioned between said cup and anode.

3. A lithium halide battery as set forth in claims 1 and 2 wherein said first cell includes a cathode current collector positioned between said cathode and said cup of said second cell, said cathode current collector being in electrical contact with said anode of said second cell.

4. A lithium halide battery as set forth in claim 2 wherein a metal disc is positioned between said first cup and said expanded metal current collector of said first cell, said disc being attached to said current collector at the respective perimeters of said collector and metal disc for electrical contact and said metal disc being elecrically connected to said terminal.

5. A lithium halide battery as set forth in claim 4 wherein said metal disc, current collector and anode of said first cell each include an aligned opening into which a lithium plug is extruded.

* * * * *